United States Patent
Entenmann

(10) Patent No.: US 10,175,766 B2
(45) Date of Patent: Jan. 8, 2019

(54) METHOD TO OPERATE A GESTURE RECOGNITION SYSTEM FOR A MOTOR VEHICLE

(71) Applicant: Daimler AG, Stutttgart (DE)

(72) Inventor: Volker Entenmann, Affalterbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/021,550

(22) PCT Filed: Aug. 27, 2014

(86) PCT No.: PCT/EP2014/002337
§ 371 (c)(1),
(2) Date: Mar. 11, 2016

(87) PCT Pub. No.: WO2015/036089
PCT Pub. Date: Mar. 19, 2015

(65) Prior Publication Data
US 2016/0231823 A1    Aug. 11, 2016

(30) Foreign Application Priority Data
Sep. 14, 2013 (DE) ......................... 10 2013 015 337

(51) Int. Cl.
*G06F 3/01* (2006.01)
*G06F 3/0488* (2013.01)
(Continued)

(52) U.S. Cl.
CPC .............. *G06F 3/017* (2013.01); *B60K 35/00* (2013.01); *B60K 37/06* (2013.01); *G06F 3/0304* (2013.01);
(Continued)

(58) Field of Classification Search
CPC .... G06F 3/017; G06F 3/0204; G06F 3/04883; B60K 35/00; B60K 37/06;
(Continued)

(56) References Cited

U.S. PATENT DOCUMENTS

| | | | |
|---|---|---|---|
| 8,212,794 B2 | 7/2012 | Lee et al. | |
| 2010/0027845 A1 | 2/2010 | Kim et al. | |

(Continued)

FOREIGN PATENT DOCUMENTS

| | | |
|---|---|---|
| DE | 10 2004 033 335 A1 | 2/2006 |
| EP | 2 469 496 A1 | 6/2012 |

OTHER PUBLICATIONS

PCT/EP2014/002337, International Search Report (PCT/ISA/220 and PCT/ISA/210) dated Dec. 2, 2014, with partial English translation, enclosing Written Opinion of the International Searching Authority (PCT/ISA/237) (Ten (10) pages).

*Primary Examiner* — Mark Regn
(74) *Attorney, Agent, or Firm* — Crowell & Moring LLP

(57) ABSTRACT

A method to operate a gesture recognition system for a motor vehicle is disclosed. The method includes: detection of a movement gesture by a detection unit; generation of a movement vector, which represents the moment gesture, by the detection unit; transmission of the movement vector to a processing unit; comparison of the movement vector with at least two limit curves, which define at least three separate regions in a section of the vector space; and determination of a direction of the movement gesture as horizontal if the movement vector lies in a first region, as vertical if the movement vector lies in a second region, and as not able to be classified if the movement vector lies in a third region. The limit curves are defined by functions which depend on (Continued)

spatial directions in a non-linear manner in order to increase recognition and classification reliability of the gesture recognition system.

8 Claims, 1 Drawing Sheet

(51) Int. Cl.
    *B60K 37/06*     (2006.01)
    *G06K 9/00*     (2006.01)
    *B60K 35/00*     (2006.01)
    *G06F 3/03*     (2006.01)
    *G06T 7/20*     (2017.01)
    *G06T 9/00*     (2006.01)

(52) U.S. Cl.
    CPC ..... *G06F 3/04883* (2013.01); *G06K 9/00355* (2013.01); *G06T 7/20* (2013.01); *G06T 9/00* (2013.01); *B60K 2350/1052* (2013.01)

(58) Field of Classification Search
    CPC ........ B60K 2350/1052; G06K 9/00335; G06T 7/20; G06T 9/00
    USPC .......................................................... 345/173
    See application file for complete search history.

(56) References Cited

U.S. PATENT DOCUMENTS

2010/0079411 A1*   4/2010   Lee ..................... G06F 3/03547
                                                        345/175
2010/0185341 A1*   7/2010   Wilson ............... B60R 25/2045
                                                           701/1
2011/0193939 A1*   8/2011   Vassigh ................. G06F 3/011
                                                            348/46

* cited by examiner

METHOD TO OPERATE A GESTURE RECOGNITION SYSTEM FOR A MOTOR VEHICLE

BACKGROUND AND SUMMARY OF THE INVENTION

The invention relates to a method to operate a gesture recognition system for a motor vehicle as well as a gesture recognition system.

In modern motor vehicles, gesture recognition systems are increasingly used for the control of additional functions of the motor vehicle. A plurality of different gesture recognition systems are applied here. These are both contactless gesture recognition systems which, for example, recognize a gesture via a camera, and gesture recognition systems which must be touched by a user in order to be able to recognize a gesture. Examples here are touch-sensitive screens or also optical finger navigation modules which are often also referred to as "OFN". It applies for all gesture recognition systems in a motor vehicle that a speed, above all however a direction, of a gesture is to be defined as precisely as possible. The current speed and the direction of a gesture can be depicted, i.e., represented, by a velocity vector. The direction thereof then represents the direction of the detected gesture and its length represents the speed of the gesture. A velocity vector is then often classified in the scope of a quantification of the gesture to determine the direction of a gesture, in order, for example, to differentiate horizontal and vertical gestures from each other.

In U.S. Pat. No. 8,212,794 B2, an optical finger navigation module is disclosed which is designed to quantify and to classify operating gestures by means of a comparison of detected movement information with linear limit functions.

The object of the present invention is to provide a method to operate a gesture recognition system for a motor vehicle, with which recognition reliability as well as classification reliability is increased. The object of the invention is also to provide a device to implement such a method.

This object is solved according to the invention by a method or a gesture recognition system according to the independent claims. Advantageous embodiments of the invention are subject matter of the dependent claims, the description and the figures.

in order to increase recognition reliability and classification reliability, a series of steps are provided in a method according to the invention to operate a gesture recognition system for a motor vehicle: Firstly, a detection of a movement gesture which belongs to an operating action, by a detection unit. Then a generation of a movement vector, which represents the detected gesture, by the detection unit, followed by a transmission of the movement vector to a processing unit. Then a comparison of the movement vector with at least two limit curves, which define at least three separate regions in a section of a vector space, by the processing unit. Then, depending on a result of the previously implemented comparison, a determination of a direction of the movement gesture by the processing unit as horizontal if the movement vector lies in a first region of the three separate regions, as vertical if the movement vector lies in a second region of the three separate regions, and as not able to be classified if the movement vector lies in a third region of the three separate regions. It is essential for the invention here that the limit curves be defined by functions which depend on the spatial directions in a non-linear manner.

The movement gesture is therefore quantized here in a non-linear way into a mainly horizontal or vertical movement. This has the advantage that a limited sensor resolution can be considered via a design of non-linearity, and therefore, especially for slow finger movements, in the case of which in general the directional information is less accurate due to the limited sensor resolution than for quick finger movements, increased recognition reliability is achieved. Due to the non-linear limit curves, the directional tolerance for slow movements can in particular be designed to be greater than for quick movements. Furthermore, typical movement characteristics which occur during the operation of the gesture recognition system can also be considered during gesture classification or quantization via the non-linear functions, and therefore the classification reliability can be increased.

In a preferred embodiment of the invention, it is provided that the spatial directions, on which the functions which define the limit curves depend, are an x-direction and a y-direction. The limit curves are therefore defined in a plane. This has the advantage that the method increases recognition reliability and classification reliability for two-dimensional movement gestures. In particular, scrolling as an operating action can therefore be processed efficiently. Additionally, a two-dimensional implementation of the method is simple to achieve as only a low calculation capacity is required.

In a particularly advantageous embodiment, it is provided that the two non-linear functions, which define the limit curves if they are transformed into a vector angle-vector length space, assume a finite, predetermined vector angle initial value, in particular between 30° and 60°, for infinitely small vector lengths and a finite, predetermined vector angle final value, in particular between 10° and 80°, for infinitely large vector lengths. This has the advantage that a classification range of the movement gesture can therefore be defined explicitly for short vectors, therefore slow movements, and at the same time a limit range can be defined in this way for long vectors, i.e., quick movements, by no classification occurring. As the two functions are non-linear, the two advantages referred can be adjusted explicitly and independently of each other, and furthermore almost any characteristics of the classification or quantization of the gesture movement can furthermore be transferred between the extremes of very slow and very quick movements, so very short and very long vectors.

In a preferred embodiment, it is provided that the vector angle final value of the first non-linear function is greater than its vector angle initial value and the vector angle final value of the second non-linear function is smaller than its vector angle initial value, wherein the vector angle initial value of the first non-linear function is greater than or equal to the vector angle initial value of the second non-linear function. This leads to the limit curves for small vector lengths being closer to each other in the vector angle-vector length space than for large vector lengths. Therefore in particular the angle range of the vector space in which a vector is not allocated to a horizontal or vertical movement is classified as smaller for small vector lengths than for large vector lengths. This has the advantage that the directional tolerance for slow movements is greater than for quick movements, so in particular deviations from the horizontal and/or vertical direction for slow movement gestures lead to a determination of the direction of the movement gesture as "not able to be classified" less easily than for quick movement gestures. Therefore, recognition reliability and classification reliability are increased, especially for slow movements.

It can furthermore be provided that, before the comparison of the vectors with the limit curves, negative components of the movement vector are multiplied by −1 and the section of the vector space in which the comparison is carried out exclusively comprises values greater than or equal to zero. In particular, the section of the vector space therefore comprises the so-called first quadrant which is defined as greater than or equal to zero in an x-y-plane by x- and y-values. In other words, for a classification of the movement gesture, for example, movement gestures directed to the left or to the right therefore cannot be differentiated between, but only the angle of the movement gesture is regarded. This has the advantage that the limit curves can be provided particularly simply and an expensive checking of applicable ranges of different limit functions is not required.

Analogously, before the comparison, the limit curves can also be mirrored from the first quadrant into the other quadrants and the components of the movement vector can be left unchanged. The comparison then therefore occurs in the entire vector space, but outside the first quadrant, only with the respective mirror images of the limit curves and not with the functions from which the limit curves are derived.

The invention also relates to a gesture recognition system for a motor vehicle. This has a detection unit which is designed to detect a movement gesture which belongs to an operating action, to generate a movement vector which represents the movement gesture and to transmit the movement vector to a processing unit. This processing unit is likewise part of the gesture recognition system and is designed to compare the movement vector with at least two limit curves which define at least three separate regions in a section of a vector space and, depending on a result of the comparison, to determine a direction of the movement gesture as horizontal if the movement vector lies in a first region of the three separate regions, as vertical if the movement vector lies in a second region of the three separate regions and as not able to be classified if the movement vector lies in a third region of the three separate regions. Herein the processing unit is designed to use limit curves for the comparison which are defined by functions which depend on spatial directions in a non-linear manner.

It can be provided that the detection unit is a touch-sensitive detection unit. This has the advantage that an efficient determination of the velocity vector is possible as, especially in a motor vehicle having several passengers, the movement data is fundamentally only detected if in fact a touching is also present, so a gesture is intended and therefore a gesture recognition is desired.

In a particularly advantageous embodiment it is also provided that the detection unit is an optical finger navigation module. Such modules, also referred to as "OFN", are suitable in a very specific way for an application of the method, as these typically provide less accurate directional information especially for slow finger movements, than for quick finger movements. Therefore, increased recognition reliability or classification reliability is particularly desirable here. In particular, such modules are particularly small, applicable in a varied manner and save electricity, such that they are expedient for use in a motor vehicle.

The preferred embodiment presented with regard to the method according to the invention and the advantages thereof apply accordingly for the device according to the invention and vice versa, Further features of the invention result from the claims, the figures and the description of the figures. All features and feature combinations referred to above in the description as well as the features and feature combinations referred to below in the description of the figures and/or shown only in the figures are not only applicable in the respectively specified combination, but also in other combinations or, however, alone.

Exemplary embodiments of the invention are explained below by means of the figures.

DETAILED DESCRIPTION OF THE DRAWINGS

Figure 1:
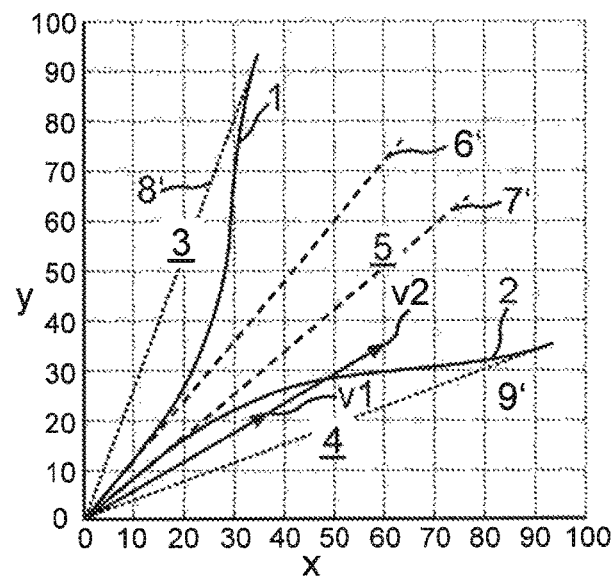
FIG. 1 illustrates limit curves of one embodiment of the method according to the invention in a section of a vector space spanned by two spatial directions.

In the figures, identical or functionally identical elements are provided with the same reference numerals.

In FIG. 1, two limit curves 1, 2 according to one exemplary embodiment of a. method according to the invention are shown. A section of a vector space spanned by two spatial directions, in particular the x-direction x and the y-direction y, is depicted here. The section is, in the present example, the first quadrant, i.e., it comprises all vectors consisting of positive vector entries x and y. In this section, the two limit curves 1, 2 are marked which extend in a monotone and increasing manner originating from the origin and in the present example even with a mutual axis of symmetry in the first quadrant, without thereby crossing each other. These two limit curves 1, 2 define three regions 3, 4, 5. The first region 3 is located here between the y-axis and the limit curve 1, Movement vectors which are located in this first region 3 or end in this region 3 are allocated, in the shown example, to a vertical movement. The second region 4 is located, in the shown example, between the limit curve 2 and the x-axis, Each movement vector v1 which is located in the region 4, i.e., ends in this, is classified representatively as a horizontal movement. The third region 5 is located between the two limit curves 1, 2. Each movement vector v2 which ends in this region 5 or the movements belonging to the movement vector v2 ending in this region 5 are filed as not able to be classified. The limit curve 1 initially lies at the origin on a straight line 6' which likewise goes through the origin. With increasing x-values, however, the limit curve 1 gradually detaches from the straight line 6'. With increasing x-values, the limit curve 1 is removed more and more from the straight line 6' and finally nestles asymptotically on a straight line 8', which likewise runs through the origin and has a greater gradient than the straight line 6'. The limit curve 2 shows analogous behavior. This is congruent with a straight line 7' at the origin, from which it detaches with increasing x-values in order to then approach a straight line 9' asymptotically which runs through the origin like straight line 7'. In this case, however, the straight line 9' has a lower gradient than the straight line 7'. In the shown example, the straight line 7' has a lower gradient than the straight line 6'.

Figure 2:
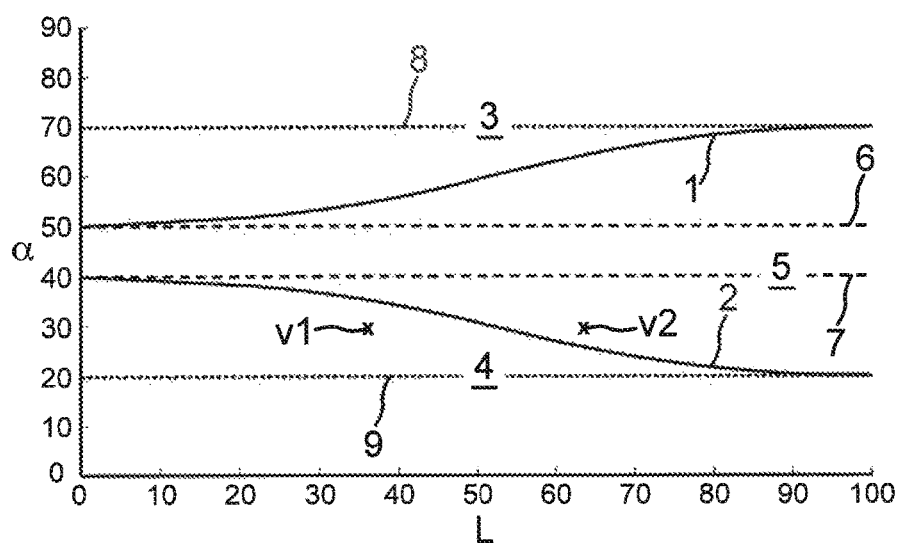
FIG. 2 is a depiction of the limit curves of the example shown in FIG. 1 in a vector angle-vector length space.

If a movement vector v1, v2, for example, is now compared with the two limit curves 1, 2, it is checked where the end point of the movement vector v1, v2 is located in the shown depiction. Depending on the region 3, 4, 5 in which the end point is then located, the movement gesture belonging to the movement vector v1, v2 is classified as in the present example as horizontal or vertical or, however, as "not able to be classified". A particular, typical characteristic of the quantizing of the movement gestures or their directions is here achieved via the non-linear character of the limit curves 1, 2. Therefore a movement vector v1 which represents a movement gesture in a certain direction with a certain speed is filed in the present example as a horizontal movement. If the same gesture is now implemented with an increased speed, it is then represented by another vector v2 which has the same vector angle α (FIG. 2) but a different vector length L (FIG. 2). The direction of the operating movement is therefore the same, only the speed is different. The non-linear limit curve here now has the consequence that the quicker movement with the same direction is filed as not able to be classified. Therefore, for example, it is taken into account from practical experience that, for slow movement gestures, the directional information is in general less accurate due to limited sensor resolution, than for quick finger movements. Therefore, it is enabled in the present example via the non-linear limit function that slow movements are classified as horizontal or vertical with a greater directional tolerance. At the same time, the directional tolerance for quicker movements is reduced such that, in the shown example, a change of the movement direction can in particular be recognized quickly and reliably.

In FIG. 2, the limit curves 1, 2 of the exemplary embodiment shown in FIG. 1 are depicted in a different vector space. This is the vector angle-vector length space in which the vector angle α is applied over the vector length L. In this vector space, the limit curves 1, 2 in the present example are described by functions of the form $\alpha(L)=\alpha_{End}+(\alpha_{start}-\alpha_{End})*\exp[-a*(L/b)^c]$, wherein $\alpha_{End}$, $\alpha_{Start}$, a, b and c are parameters, via which the limit curve course can be influenced. The limit curves 1, 2 are here shown for a=0.5, b=50 and c=3 as well as $\alpha_{start}=50°$ and $\alpha_{End}=70°$ for limit curve 1 and $\alpha_{start}=40°$ and $\alpha_{End}=20°$ for limit curve 2. Obviously other mathematical descriptions of the limit curves are possible which supply the same or similar properties.

The straight lines 6', 7', 8', 9' (FIG. 1) here pass into vector angle initial values 6, 7 as well as into vector angle final values 8, 9, as the straight lines 6', 7', 8', and 9' (FIG. 1) each represent a certain vector angle α. The asymptotic approach of the two limit curves 1, 2 to the vector angle initial values 6, 7 is clearly recognizable here for vector lengths approaching zero and their asymptotic approach to the vector angle final values 8, 9 for infinitely large vector lengths L. In particular in this depiction of the example, it is also clear that the third region 5 in which a movement is classified as "not able to be classified" is substantially narrower for short vector lengths L, so smaller than for large vector lengths L. This has the consequence here that, as already described in FIG. 1, the vector v1 lies in the region 4 which is allocated to a horizontal movement, whereas the vector v2 which has the same direction as vector v1, but has a larger vector length L, can no longer be categorized, as it falls into the third region 5. A depiction of the conventional linear limit functions in the vector angle-vector length space would, however, show a reversed effect. If, in particular, the usual linear limit curves are transformed in this space, then it is determined that either straight lines in parallel to the vector length axis are obtained, or non-linear functions are obtained which have a very wide, therefore large region 5 in which a vector cannot be classified for short vector lengths and at the same time this region 5 comprises a smaller and smaller angular range for large vector lengths L. Then, in particular, for large vector lengths L, the transformed limit curves do not diverge from each other, but rather converge or approach each other and therefore deliver completely different characteristics from the present invention.

The invention claimed is:

1. A method to operate a gesture recognition system for a motor vehicle, comprising the steps of:
   detecting a movement gesture, which belongs to an operating action, by a detection unit;
   generating a movement vector, which represents the movement gesture with a vector direction and a vector speed, by the detection unit;
   transmitting the movement vector to a processing unit;
   comparing the movement vector with a first limit curve and a second limit curve, which define at least three separate regions in a section of a vector space, by the processing unit; and
   depending on a result of the comparing, determining a direction of the movement gesture by the processing unit as horizontal if the movement vector lies in a first region of the at least three separate regions, as vertical if the movement vector lies in a second region of the at least three separate regions, and as not able to be classified if the movement vector lies in a third region of the at least three separate regions;
   wherein the first limit curve and the second limit curve are defined by a respective first non-linear function and a second non-linear function which depend on spatial directions and wherein via the first non-linear function and the second non-linear function a directional tolerance for slow movement gestures is greater than for quick movement gestures.

2. The method according to claim 1, wherein the spatial directions are an x-direction and a y-direction.

3. The method according to claim 1, wherein before the comparing, negative components of the movement vector are multiplied by −1 and the section of the vector space exclusively comprises values greater than or equal to zero.

4. A method to operate a gesture recognition system for a motor vehicle, comprising the steps of:
   detecting a movement gesture, which belongs to an operating action, by a detection unit;
   generating a movement vector, which represents the movement gesture, by the detection unit;
   transmitting the movement vector to a processing unit;
   comparing the movement vector with a first limit curve and a second limit curve, which define at least three separate regions in a section of a vector space, by the processing unit; and
   depending on a result of the comparing, determining a direction of the movement gesture by the processing unit as horizontal if the movement vector lies in a first region of the at least three separate regions, as vertical if the movement vector lies in a second region of the at least three separate regions, and as not able to be classified if the movement vector lies in a third region of the at least three separate regions;
   wherein the first limit curve and the second limit curve are defined by a respective first function and a second function which depend on spatial directions in a non-linear manner;
   wherein the spatial directions are an x-direction and a y-direction;
   wherein the first function and the second function when transformed into a vector angle-vector length space, assume a finite, predetermined vector angle initial value between 30° and 60° for infinitely small vector lengths, and a finite, predetermined vector angle final value between 10° and 80° for infinitely large vector lengths.

5. The method according to claim 4, wherein the vector angle final value of the first function is greater than the vector angle initial value of the first function, wherein the vector angle final value of the second function is smaller than the vector angle initial value of the second function, and wherein the vector angle initial value of the first function is greater than or equal to the vector angle initial value of the second function.

6. A gesture recognition system for a motor vehicle, comprising:
- a detection unit which is configured to detect a movement gesture which belongs to an operating action, to generate a movement vector which represents the movement gesture with a vector direction and a vector speed, and to transmit the movement vector to a processing unit; and
- a processing unit which is configured to compare the movement vector with a first limit curve and a second limit curve which define at least three separate regions in a section of a vector space, and depending on a result of the comparison, to determine a direction of the movement gesture as horizontal if the movement vector lies in a first region of the at least three separate regions, as vertical if the movement vector lies in a second region of the at least three separate regions, and as not able to be classified if the movement vector lies in a third region of the at least three separate regions;
wherein the first limit curve and the second limit curve are defined by a respective first non-linear function and a second non-linear function which depend on spatial directions and wherein via the first non-linear function and the second non-linear function a directional tolerance for slow movement gestures is greater than for quick movement gestures.

7. The gesture recognition system according to claim 6, wherein the detection unit is a touch-sensitive detection unit.

8. The gesture recognition system according to claim 6, wherein the detection unit is an optical finger navigation module.

* * * * *